United States Patent [19]
Adam

[11] Patent Number: 5,239,967
[45] Date of Patent: Aug. 31, 1993

[54] PORTABLE HANDHELD WORK APPARATUS HAVING AN INTERNAL COMBUSTION ENGINE AND AN INJECTION PUMP

[76] Inventor: Roland Adam, Besigheim, Fed. Rep. of Germany

[21] Appl. No.: 993,002

[22] Filed: Dec. 18, 1992

[30] Foreign Application Priority Data

Dec. 20, 1991 [DE] Fed. Rep. of Germany ....... 4142354
  [St]   l; Andreas ...................... Waiblingen

[51] Int. Cl.$^5$ ...................... F02M 39/02; F02B 63/02
[52] U.S. Cl. ................................ 123/509; 123/73 CB
[58] Field of Search ............. 123/509, 73 AD, 73 CC, 123/73 BC, 73 CB; 417/380, 381, 383, 387

[56] References Cited

U.S. PATENT DOCUMENTS

| | | | |
|---|---|---|---|
| 4,548,173 | 10/1985 | Yabumoto et al. | 123/73 CB |
| 4,552,101 | 11/1985 | Borst et al. | 123/73 AD |
| 4,555,221 | 11/1985 | Du Bois | 123/73 AD |
| 4,627,390 | 12/1986 | Antoine | 123/509 |
| 4,690,108 | 9/1987 | Debevec | 123/73 AD |
| 4,915,063 | 4/1990 | Stumpf | 123/509 |
| 4,928,390 | 5/1990 | Gassen et al. | 123/73 AD |
| 4,932,370 | 6/1990 | Schierling et al. | 123/73 AD |
| 4,976,246 | 12/1990 | Schierling et al. | 123/509 |
| 5,024,188 | 6/1991 | Hartke et al. | 123/509 |
| 5,083,545 | 1/1992 | Yamashita et al. | 123/509 |

*Primary Examiner*—E. Rollins Cross
*Assistant Examiner*—Thomas Moulis
*Attorney, Agent, or Firm*—Walter Ottesen

[57] ABSTRACT

The invention relates to a portable handheld work apparatus having an internal combustion engine and an injection pump. The work apparatus includes an injection-pump block which is mounted on the housing of the work apparatus. The injection-pump block includes a feed pump for pumping fuel from a fuel tank mounted in the housing of the work apparatus and the injection pump for injecting fuel into the engine. An interface is provided between the block and the housing through which connecting lines are passed. Each line includes a connecting receptacle and a plug-in element at the interface. The plug-in elements jointly engage corresponding ones of the connecting receptacles when the injection-pump block is seated in the housing of the work apparatus. In this way, all connections of the connecting lines are made simultaneously when fixing the injection-pump block in position. A simplified installation of the injection-pump block in the housing of the work apparatus is achieved with the invention.

10 Claims, 3 Drawing Sheets

PORTABLE HANDHELD WORK APPARATUS HAVING AN INTERNAL COMBUSTION ENGINE AND AN INJECTION PUMP

BACKGROUND OF THE INVENTION

U.S. Pat. No. 4,976,246 discloses a motor-driven chain saw having an internal combustion engine wherein the injection-pump block is mounted geodetically above a fuel tank built into the housing and in a filter chamber of the handle housing part. The engine is mounted via vibration elements in the housing and is connected via flexible lines to the injection-pump block. However, it is disadvantageous that the necessary supply lines are connected in individual work steps after assembly of the injection pump. This is very time consuming.

SUMMARY OF THE INVENTION

It is an object of the invention to simplify the installation of an injection-pump block in the handle housing part of a portable handheld work apparatus.

The portable handheld work apparatus of the invention is an apparatus such as a motor-driven chain saw, cutoff machine, brushcutter or the like. The work apparatus includes: a housing defining a housing end face; a work tool movably mounted on the housing; an internal combustion engine mounted in the housing and operatively connected to the work tool for driving the work tool; the engine having a crankcase wherein a crankcase pressure develops during operation of the engine and having an intake channel for conducting combustion air into the engine; an injection pump for metering fuel to the engine, the injection pump having a fuel intake connection and a fuel output connection; an injection line connecting the output connection of the injection pump to the engine for passing the metered fuel to the engine; a fuel feed pump having a pressure line connected to the fuel intake connection of the injection pump; a fuel tank mounted in the housing for holding the fuel for the engine; a feed line interconnecting the fuel tank and the feed pump; a return line interconnecting the feed pump and the fuel tank for returning excess fuel to the fuel tank; the feed pump and the injection pump being assembled into an injection pump block defining a block end face; first and second pulse lines for connecting the injection pump and the feed pump, respectively, to the crankcase thereby permitting the crankcase pressure to drive the pumps; mounting means for mounting the injection pump block in the housing so as to cause the block end face and the housing end face to conjointly define an interface when the block is seated in the housing; first connection means connected into the injection line at the interface and including a first connecting receptacle fixedly held in one of the end faces and a first plug-in element held in the other one of the end faces so as to be in alignment with the first connecting receptacle; second connecting means connected into the feed line at the interface and including a second connecting receptacle fixedly held in one of the end faces and a second plug-in element held in the other one of the end faces so as to be in alignment with the second connecting receptacle; third connection means connected into the return line at the interface and including a third connecting receptacle fixedly held in one of the end faces and a third plug-in element held in the other one of the end faces so as to be in alignment with the third connecting receptacle; fourth connection means connected into the first pulse line at the interface and including a fourth connecting receptacle fixedly held in one of the end faces and a fourth plug-in element held in the other one of the end faces so as to be in alignment with the fourth connecting receptacle; and, fifth connection means connected into the second pulse line at the interface and including a fifth connecting receptacle fixedly held in one of the end faces and a fifth plug-in element held in the other one of the end faces so as to be in alignment with the fifth connecting receptacle.

The connecting receptacles are held fixedly on the housing and the plug-in elements are on the injection-pump block. With this arrangement, the plug-in elements can jointly engage in the connecting receptacles when axially seating the injection-pump block so that all connections of the connecting lines are made simultaneously when fixing the injection-pump block. It has been surprisingly shown that this simple manner of connecting the lines is also adequate for the injection line and leaks in this pressure-critical area do not occur which has been confirmed in practice.

It is advantageous to configure the connecting receptacles of the fuel supply, the fuel return and the pulse line as bushings to which pins on the injection-pump block are assigned which function appropriately as plug-in elements. If the bushings are defined by the ends of the elastically-configured lines held fixedly in the housing then possible positioning impreciseness is easily compensated without problems occurring when attaching the injection-pump block in the handle housing part.

The forward end faces of the plug-in elements for the pulse lines can define a plane which is positioned forward of the housing end and the other plug-in elements. With this arrangement, the plug-in elements for the pulse lines first enter into the corresponding connecting receptacles fixedly held in the housing so that, during the assembly, first a seal-tight interengagement only of this connection must be given attention. Only then do the plug-in elements for the fuel supply and the fuel return interengage because their forward end faces define a common plane which is forward of the plug-in element for the injection line. Only at the end is the connection to the injection line established.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
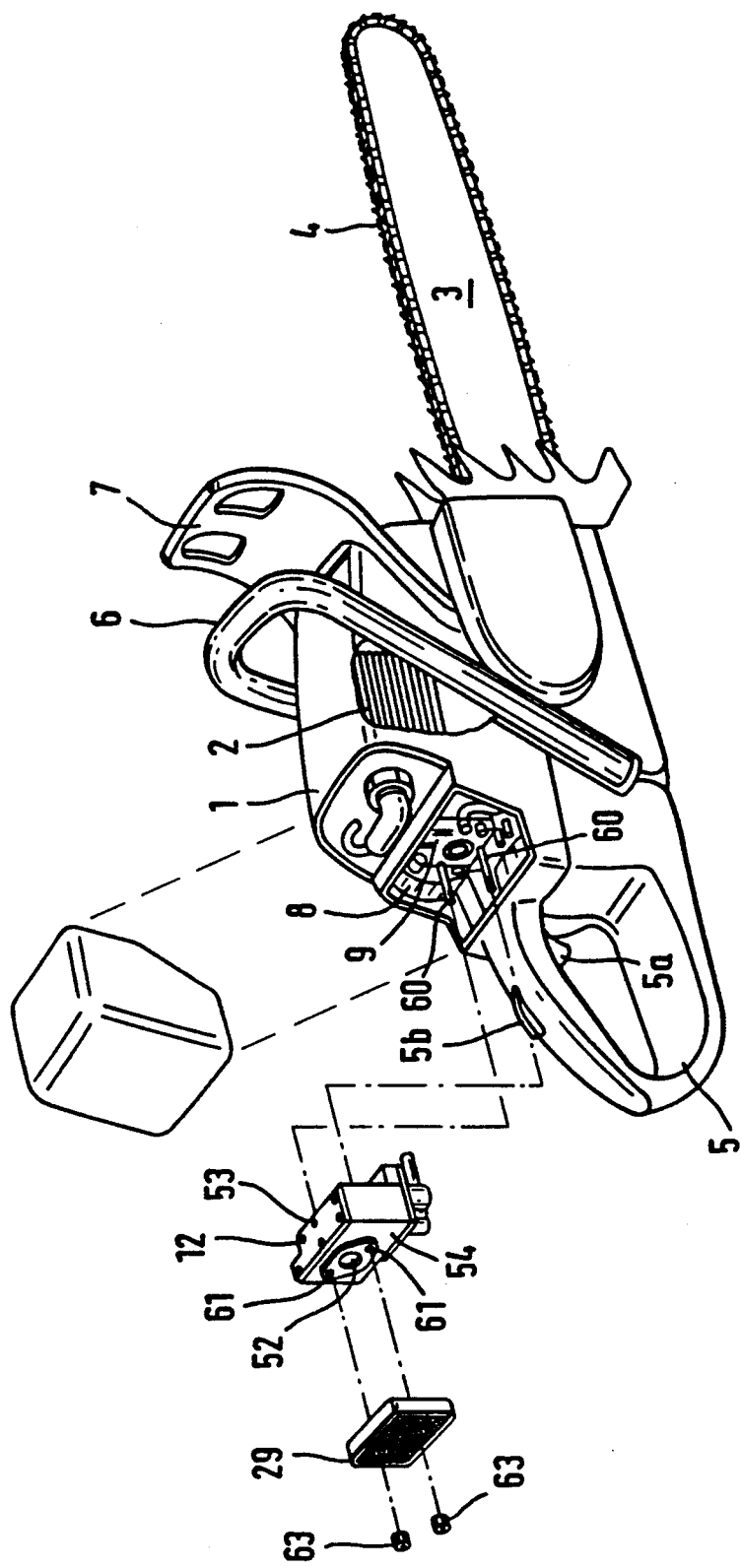
FIG. 1 is a perspective view of a motor-driven chain saw with an open handle housing.

The portable work apparatus shown in FIG. 1 is a motor-driven chain saw having an internal combustion engine mounted in a housing 1. The engine 2 shown is a two-stroke engine. The engine drives a saw chain 4 which continuously runs on a guide bar 3. The guide bar extends perpendicularly in the forward direction from an end face of the housing. A rearward handle 5 is mounted on the housing end face facing away from the guide bar and is directed in the longitudinal direction of the motor-driven chain saw. The handle 5 is part of housing 1 wherein the engine 2 is held via antivibration elements. An upper handle 6 extends over the housing 1 and lies transversely to the longitudinal direction of the chain saw. A hand guard 7 is mounted forward of the handle 6.

A fuel tank 10 is configured in the housing 1 and fuel is drawn by suction from the tank by an injection pump 11 mounted in an injection-pump block 12. The fuel is then injected into the combustion chamber 13 via an injection valve 14. The injection-pump block 12 is mounted in a separate space 8 in the housing. The injection-pump block 12 is fixed to a wall 9 separating the space 8 from the engine 2.

Figure 2:
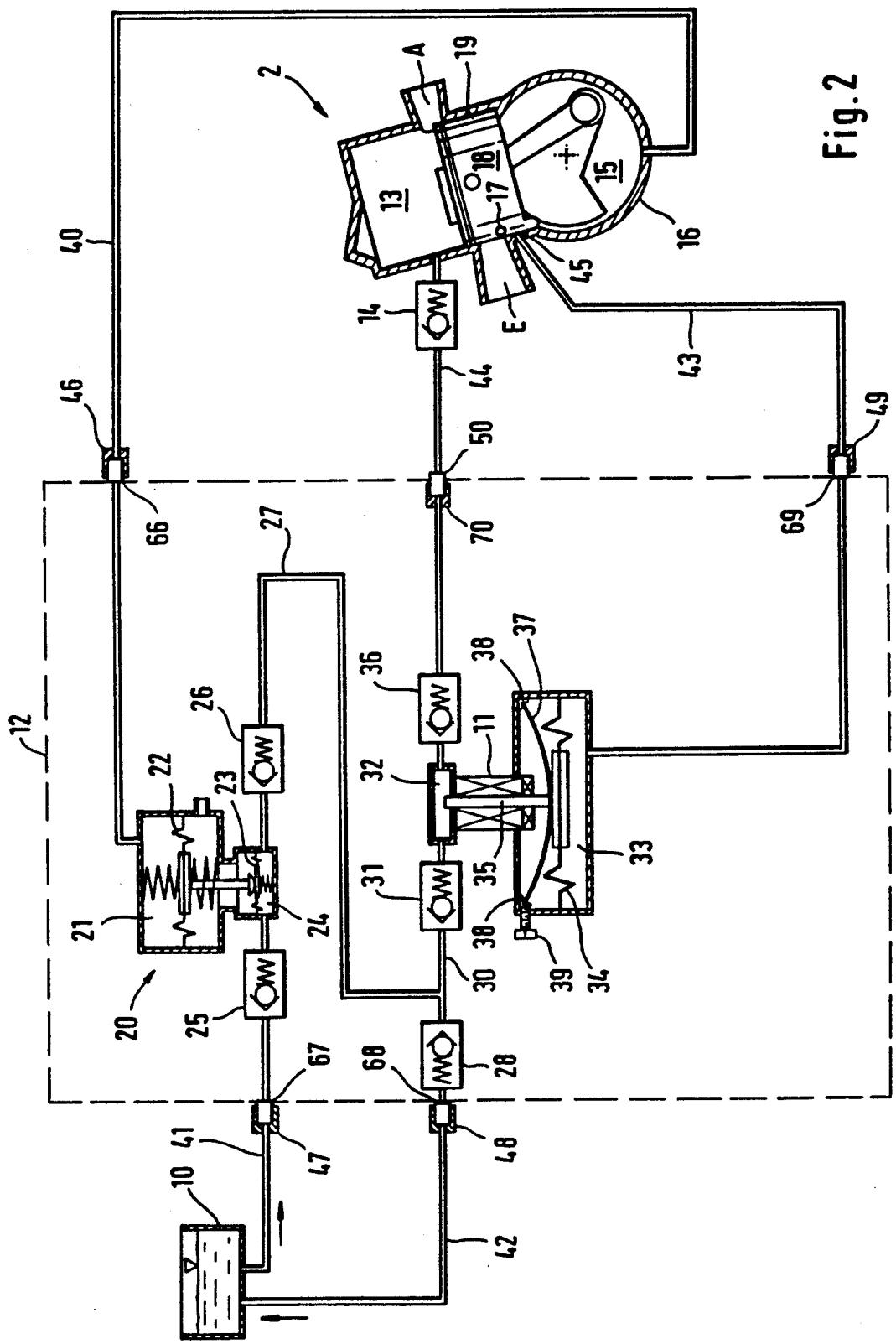
FIG. 2 is a functional schematic of the injection device built into the handle housing; and, FIG. 3 is an enlarged schematic showing the connecting end built into the handle housing for an injection-pump block.

As the function schematic of FIG. 2 shows, a fuel-feed pump 20 and the injection pump 11 are combined to one component in the injection-pump block 12. The fuel-feed pump 20 is driven by the crankcase pressure of the two-stroke engine and, for this reason, a work chamber 21 delimited by a membrane 22 is connected via a line 40 to the inner space 15 of the crankcase 16. The membrane 22 controls a pump membrane 23 via a pin with the pump membrane 23 delimiting a pump chamber 24. The pump chamber 24 communicates via a suction valve 25 with a fuel supply 41 which conducts fuel from the fuel tank 10. The fuel is conducted to the suction connection 30 via a pressure valve 26 and a pressure line 27. The suction connection 30 is connected via a suction valve 31 to the injection-pump chamber 32. When the suction valve 31 is closed, the fuel pumped by the fuel-feed pump 20 flows via a pressure-holding valve 28 and a fuel-tank return back into the fuel tank 10. When the suction valve 31 is closed, the fuel-feed pump 20 therefore pumps the fuel from the fuel tank 10.

The injection pump 11 includes a work chamber 33 which is delimited by a membrane 34 which actuates a pump piston 35. The work chamber 33 communicates via a pulse line 43 and a bore 45 with the inner space 15 of the crankcase 16. The bore 45 is then controlled by a control opening 17 in the piston jacket 18 of the piston 19 so that the pump piston 35 injects fuel into the combustion chamber 13 (in correspondence to the position of the piston 19) via the pressure valve 36 and the injection line 44 as well as the injection valve 14. A force is applied to the pump piston 35 by a leaf spring 37 which determines the rest position of the pump piston 35. The ends of the leaf spring 37 lie in bearings which are supported in the housing of the injection pump 11. One of the bearings 38 is adjustable in its position via an adjusting screw 39 whereby the pretension of the leaf spring 37 can be adjusted.

The engine draws in, via an intake channel E, the combustion air necessary for combustion into the inner chamber 15 of the crankcase housing 16. The combustion air enters the combustion chamber 13 via flow channels (not shown) controlled by the piston. The exhaust gas developed by the combustion is conducted from the combustion chamber 13 via the outlet channel A.

Figure 3:
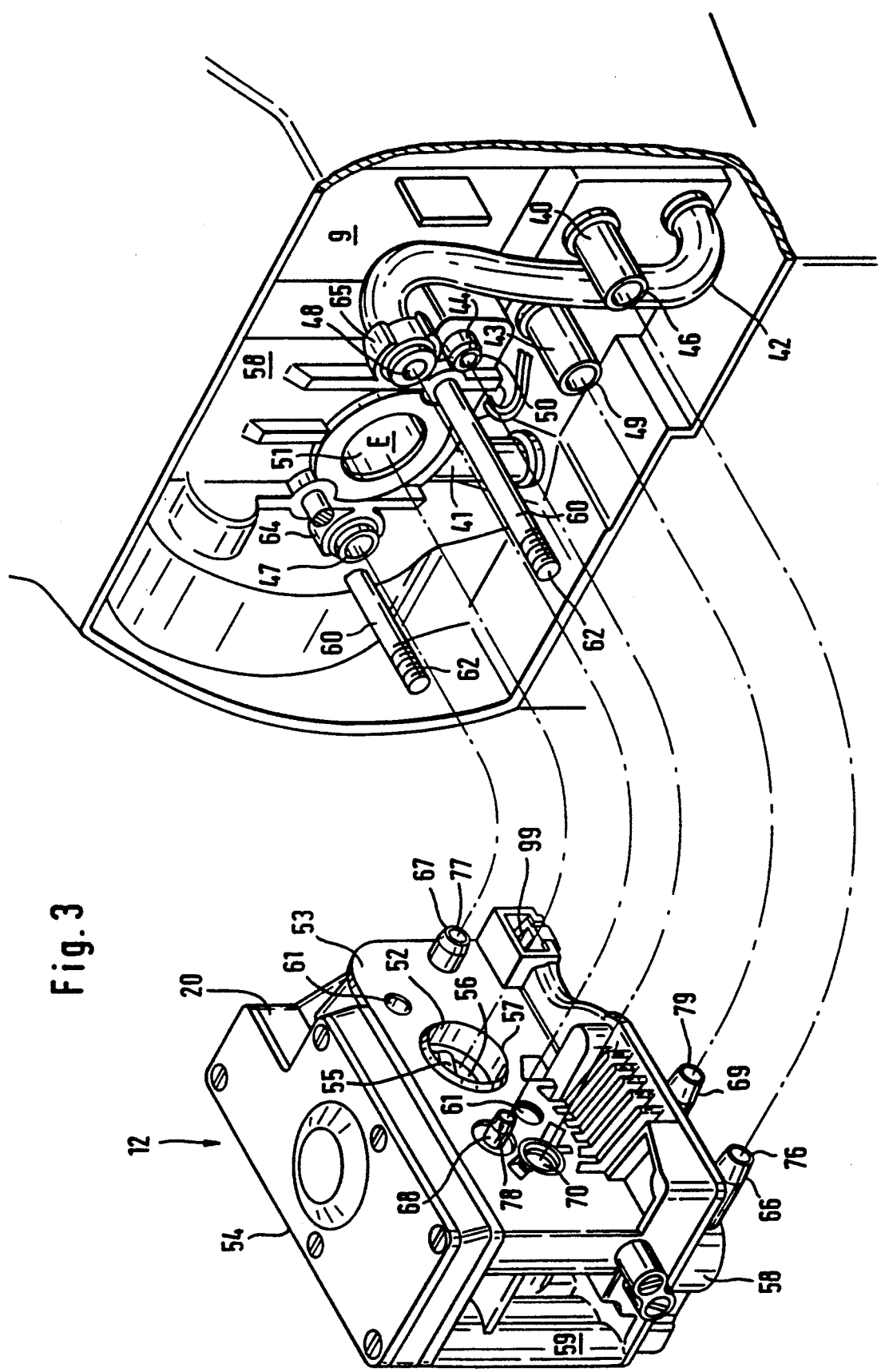

As shown in FIG. 3, an inlet opening 51 of the exhaust channel E is configured in the housing wall 9 of the filter space 8 and communicates with the intake channel E of the engine 2 via a channel segment which is especially a flexible channel segment.

The injection-pump block 12 is configured as a common component comprising the fuel-feed pump 20 and the injection pump 11. In this component, an intake-channel segment 52 is formed which extends especially as a straight-line through-channel from the one end face 53 to the other end face 54. A throttle flap 56 is pivotally mounted in the intake-channel segment 52 and is pivotable about a shaft 55. The quantity of inflowing combustion air is adjustable via the throttle flap 56. The throttle flap 56 is controllable from the throttle lever 5a via a linkage (not shown) with the throttle lever 5a being mounted in the rearward handle 5. A throttle-lever latch 5b coacts with the throttle lever 5a.

Two stud bolts 60 are fixed in the wall 9 of the filter space 8 and extend perpendicularly from this wall. The stud bolts 60 are disposed diametrically with respect to inlet opening 51 and through-bores 61 are assigned to respective ones of the stud bolts 60 in the component defining the injection-pump block 12. The bores extend parallelly to the intake-channel segment 52 and extend likewise from the one housing end face 53 along a straight line to the other housing end face 54. As shown in FIGS. 1 and 3, the component of the injection-pump block 12 is seated axially on the partition wall 9 with the stud bolts 60 lying with slight radial play in respective bores 61 and with the intake channel 52 being correctly positioned with respect to the inlet opening 51 of the intake channel E. A sealing cone 57 is provided at the end of the intake-channel segment 52 facing toward the inlet opening. The sealing cone 57 provides a seal-tight connection of the intake channel 52 to the inlet opening 51.

As shown in FIG. 1, the stud bolts 60 have end segments 62 provided with respective threads and project from the component of the injection-pump block 12. The end segments 62 carry nuts 63 which are in contact engagement with the injection-pump block 12 and clamp the block 12 tightly against the partition wall 9 thereby holding the block 12 tightly on the housing. The ends 62 advantageously support an air filter 29 which can be simultaneously held by the nuts 63 which threadably engage the end segments 62 of the stud bolts 60. In this way, the component of the injection-pump block 12 is axially clamped tightly against the partition wall 9.

The necessary connecting lines between the injection-pump block 12 and the engine 2 in the housing 1 are guided through the partition wall 9. More specifically, the connecting lines are between the injection-pump block 12 and the fuel tank 10 arranged in the housing 1. These connecting lines are configured so as to be flexible in order to provide a vibrational decoupling between the connecting receptacles 46 to 50, which are fixed in the partition wall 9, and the engine 2.

As shown in FIG. 3, the pulse lines 40 and 43 extending from the engine as well as the injection line 44 are guided approximately perpendicularly through the wall 9 so that the connecting receptacles 46, 49 and 50 lie essentially perpendicular to the plane of the partition wall 9. The lines running in the handle housing for the fuel supply 41 and the fuel return 42 to the fuel tank 10 are guided in a suitable location into the filter space 8. The lines extend close to the wall 9 with the connecting receptacles 47 and 48 being held in holders 64 and 65, respectively, fixed in the housing. The holders 64 and 65 fix the connecting receptacles 47 and 48, respectively, perpendicularly to the wall 9. The holders 64 and 65 are provided as part rings injection molded as one piece with the wall and into which the connecting receptacles 47 and 48 can be clipped. The inlet opening 51 is configured in a platform 58 arranged on the wall 9. For this reason, the fuel supply 41 and the fuel return 42 can be guided laterally next to the platform and can be seated in the holders 64 and 65 formed by injection molding laterally of the platform. The holders 64 and 65 lie approximately diametrically to the intake-channel segment 52.

The connecting receptacles 46 to 50 are precisely positioned so as to be in alignment with the plug-in elements 66 to 70 arranged on the housing side 53 of the injection-pump block 12.

The plug-in elements 67 and 68 for the fuel supply 41 and the fuel return 42 are provided as insert sleeves configured as one piece with the housing 59 of the injection-pump block 12. The respective free ends of the insert sleeves are configured to have a slight conical taper. The plug-in elements 67 and 68 lie approximately diametrically to the sealing cone 57 of the intake-channel segment 52 perpendicularly to the housing end face 53.

The plug-in element 70 for the connecting receptacle 50 of the injection line 44 lies next to the plug-in element 68 of the fuel return 42 and the one pass-through bore 61 for a stud bolt 60. The plug-in element 70 is configured as a receiving sleeve which is pressed into the housing side 53 of the base body 59.

The plug-in elements 66 and 69 are provided to connect the pulse lines 40 and 43, respectively. The plug-in elements 66 and 69 are provided in an ancillary part 58 of the injection-pump block 12 which is tightly fastened to the base housing 59 with threaded elements. The plug-in elements 66 and 69 lie perpendicularly to the housing side 53 and are configured to have conically tapered ends in a manner similar to the plug-in elements 67 and 68.

The fuel-feed pump 20 is fixed as an ancillary part to the base body 59 of the injection-pump block 12. The forward edges 76 and 79 of the plug-in elements 66 and 69, respectively, define a plane approximately parallel to the housing side 53. The plane defined by the end edges 77 and 78 of the respective plug-in elements 67 and 68 lies rearward of the plane of the end edges 76 and 79 with a spacing forward of the housing side 53.

The connecting receptacles 46 and 49 define a plane forward of the partition wall 9 with the connecting receptacles 47 and 48 defining a plane which lies between the partition wall and the first-mentioned plane. The connecting receptacle 50 of the injection line 44 lies close to the partition wall behind the two planes of the connecting receptacles 46 and 49 as well as 47 and 48.

The injection-pump block 12 is slipped onto the stud bolts 60 for mounting the same whereby the plug-in elements 66 to 70 are aligned in correct position to the connecting receptacles 46 to 50, respectively, which are fixedly held in the housing. When axially pushed on the stud bolts 60 lying diametrically to the intake channel E, the tapered ends of the plug-in elements 66 and 69 first enter into the respective connecting receptacles 46 and 49 of the pulse lines 43 and 40, respectively. Position errors can be easily compensated because of the elastic material of the connecting receptacles 46 and 49. When the injection-pump block 12 is further pushed on and along the stud bolts 60, the plug-in elements 67 and 68 enter with their tapered ends into the respective connecting receptacles 47 and 48 whereby the fuel-feed pump 20 is connected to the fuel supply 41 and to the fuel return 42. The elastic material of the connecting receptacles 47 and 48 here too permits possible position errors to be compensated.

The connecting element 50 also enters into the receiving element 70 when the attachment nuts 63 (FIG. 1) are tightened on the threaded end segments 62 of the stud bolts 60. In this way, the pressure-tight connection of the injection pump 11 to the injection line 44 is obtained. The connecting element 50 on the housing side is configured as a plug which enters seal-tight into the receiving element 70 configured as a bushing in the injection-pump block 12. It has been surprisingly shown that, by means of such a simple insert connection, the high-pressure injection line 44 can be connected absolutely seal-tight to the injection pump 11 provided in the injection-pump block 12 (FIG. 2).

An electrical contact 99 is advantageously provided in the injection-pump block 12 in the base body 59. This contact 99 is closed when the throttle flap is closed and therefore emits an electrical signal for the idle position of the throttle flap.

It is understood that the foregoing description is that of the preferred embodiments of the invention and that various changes and modifications may be made thereto without departing from the spirit and scope of the invention as defined in the appended claims.

What is claimed is:

1. A portable handheld work apparatus such as a motor-driven chain saw, cutoff machine, brushcutter or the like, the work apparatus comprising:
   a housing defining a housing end face;
   a work tool movably mounted on said housing;
   an internal combustion engine mounted in said housing and operatively connected to said work tool for driving said work tool;
   said engine having a crankcase wherein a crankcase pressure develops during operation of the engine and having an intake channel for conducting combustion air into said engine;
   an injection pump for metering fuel to said engine, said injection pump having a fuel intake connection and a fuel output connection;
   an injection line connecting said output connection of said injection pump to said engine for passing the metered fuel to said engine;
   a fuel feed pump having a pressure line connected to said fuel intake connection of said injection pump;
   a fuel tank mounted in said housing for holding the fuel for said engine;
   a feed line interconnecting said fuel tank and said feed pump;
   a return line interconnecting said feed pump and said fuel tank for returning excess fuel to said fuel tank;
   said feed pump and said injection pump being assembled into an injection pump block defining a block end face;
   first and second pulse lines for connecting said injection pump and said feed pump, respectively, to said crankcase thereby permitting said crankcase pressure to drive said pumps;
   mounting means for mounting said injection pump block in said housing so as to cause said block end face and said housing end face to conjointly define an interface when said block is seated in said housing;
   first connection means connected into said injection line at said interface and including a first connecting receptacle fixedly held in one of said end faces and a first plug-in element held in the other one of said end faces so as to be in alignment with said first connecting receptacle;

second connecting means connected into said feed line at said interface and including a second connecting receptacle fixedly held in one of said end faces and a second plug-in element held in the other one of said end faces so as to be in alignment with said second connecting receptacle;

third connection means connected into said return line at said interface and including a third connecting receptacle fixedly held in one of said end faces and a third plug-in element held in the other one of said end faces so as to be in alignment with said third connecting receptacle;

fourth connection means connected into said first pulse line at said interface and including a fourth connecting receptacle fixedly held in one of said end faces and a fourth plug-in element held in the other one of said end faces so as to be in alignment with said fourth connecting receptacle; and, fifth connection means connected into said second pulse line at said interface and including a fifth connecting receptacle fixedly held in one of said end faces and a fifth plug-in element held in the other one of said end faces so as to be in alignment with said fifth connecting receptacle.

2. The portable work apparatus of claim 1, said second, third, fourth and fifth connecting receptacles being respective sleeve bushings fixedly held in said housing end face and said second, third, fourth and fifth plug-in elements being respective sleeve inserts held in said block end face.

3. The portable work apparatus of claim 2, said feed line, said return line, said first pulse line and said second pulse line each being an elastic line and each having a first end portion fixedly held in said housing end face; and, said sleeve inserts being defined by the respective end portions of said feed line, said return line, said first pulse line and said second pulse line.

4. The portable work apparatus of claim 1, said second, third, fourth and fifth plug-in elements being mounted in said block end face and said first connecting receptacle likewise being mounted in said block end face; said plug-in elements and said first connecting receptacle mounted in said block end face having respective ends; and, said ends of said fourth and fifth plug-in elements defining a first plane disposed forward of the ends of said second and third plug-in elements and the end of said first connecting receptacle and said block end face.

5. The portable work apparatus of claim 4, said ends of said second and third plug-in elements conjointly defining a common plane disposed forward of the end of said first connecting receptacle and said block end face.

6. The portable work apparatus of claim 1, said first connecting receptacle being formed as a receiving bushing embedded in said block end face.

7. The portable work apparatus of claim 1, said intake channel having two channel segments; and, one of said channel segments being formed in said block.

8. The portable work apparatus of claim 7, further comprising a throttle flap pivotally mounted in said one channel segment.

9. The portable work apparatus of claim 1, said mounting means including a stud bolt fixedly mounted on said housing end face for holding said block on said housing to define said interface.

10. The portable work apparatus of claim 9, said stud bolt having a threaded end portion; said intake channel having first and second channel segments; said first channel segment being formed in said block; said stud bolt extending through said block and being parallel to said first channel segment; and, a holding nut threadably attached to said threaded end portion for fixedly holding said block on said housing.

* * * * *

UNITED STATES PATENT AND TRADEMARK OFFICE
CERTIFICATE OF CORRECTION

PATENT NO. : 5,239,967

DATED : August 31, 1993

INVENTOR(S) : Roland Adam

It is certified that error appears in the above-identified patent and that said Letters Patent is hereby corrected as shown below:

On the title page, under "Assignee", item [73]: insert --Andreas Stihl, Waiblingen--.

On the title page, under "Foreign Application Priority Data", item [30]: delete "[St] 1; Andreas ....... Waiblingen".

Signed and Sealed this

Fifth Day of April, 1994

Attest:

BRUCE LEHMAN

Attesting Officer

Commissioner of Patents and Trademarks